United States Patent Office 3,378,288
Patented Apr. 16, 1968

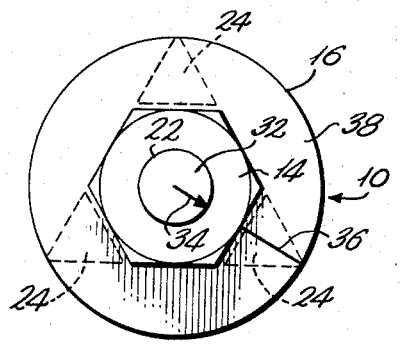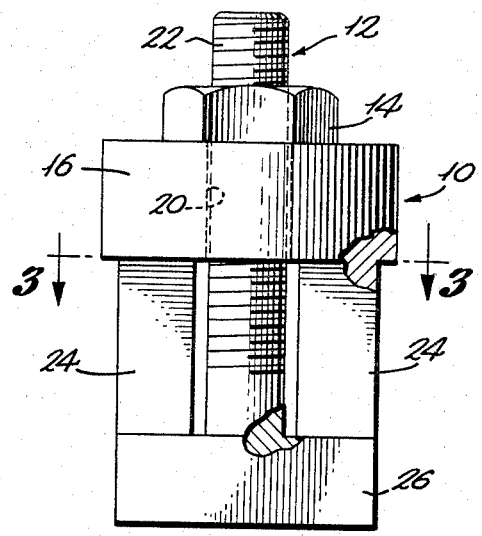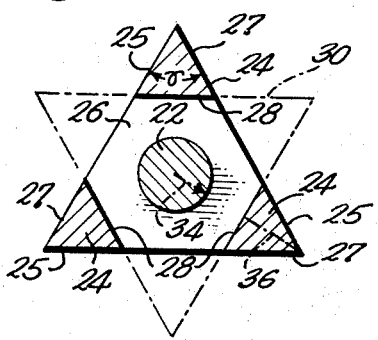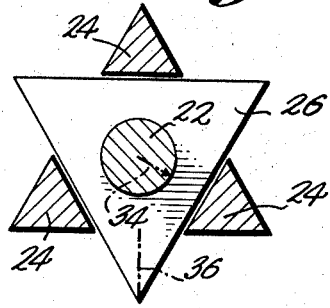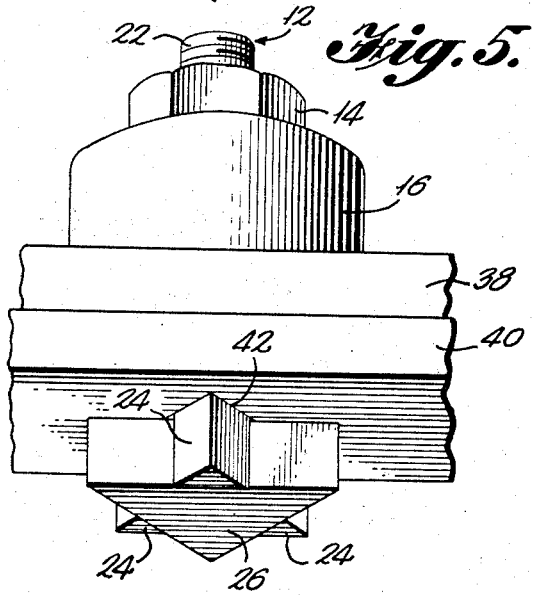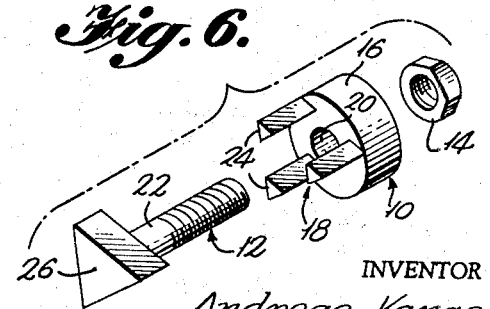

3,378,288
BLIND BOLT AND METHOD FOR ITS USE
Andreas Kanas, 481 Main St., Huntington, N.Y. 11743
Filed Feb. 23, 1966, Ser. No. 529,326
14 Claims. (Cl. 287—189.36)

ABSTRACT OF THE DISCLOSURE

A blind bolt assembly including a threaded bolt, a housing through which the threaded bolt passes with a nut adapted to be placed on the threaded bolt, the configuration of at least one of the bolt head and the nut (the "receivable member") and housing relative to one another being such that with the receivable member and housing in a first angular relationship, the bolt head and a portion of the housing may be passed through aligned apertures in a plurality of elements to be secured together and, with the receivable member and the housing in a second angular relationship, the blind bolt assembly may be fastened tight about the elements and the receivable member cannot be withdrawn back out through the apertures. A composite assembly including said blind bolt assembly and two elements bolted together by means of such assembly, and a method of bolting two elements together by means of such blind bolt assembly.

---

This invention relates to a blind bolt and to a method for its use.

In the conventional method of securing two objects to one another by means of a bolt, a bolt is passed through an aperture in each of the objects and the resulting assembly is secured by tightening a nut about the threaded shank of the bolt. There are many applications, however, where only one side of the objects to be secured together is accessible, making it impossible or at least extremely difficult to mount the nut on the threaded shank of the bolt and, even if the latter is possible, to tighten the resulting assembly.

As a result of the foregoing accessibility problem, a great variety of bolts, known as "blind bolts," have been developed in an attempt to overcome the problem. Basically speaking, a blind bolt is one which is capable of securing a plurality of objects together without the requirement of access to both ends of the bolt once the bolt is in place. The most common form of such blind bolts of the expansion type, examples of which are illustrated in Patents 1,772,064 and 3,107,569. Additional forms of blind bolts which eliminate the necessity of access to both ends of the bolt but operating on other than the expansion principles are set forth in Patents 789,553, 1,785,709 and 2,388,658.

While both the bolts of the type described in the foregoing patents and elsewhere in the literature have various advantages, each of them suffers from one or more significant deficiencies. Thus, bolts of the foregoing varieties are too cumbersome or too expensive to manufacture or suffer from one or more functional deficiencies.

In accordance with the present invention, a blind bolt assembly has now been developed which eliminates the need for access to both ends of the bolt which is extremely effective in its ability to fasten a plurality of objects to one another to form a rigid assembly and which is simple in construction and inexpensive to manufacture. This blind bolt assembly actually includes a threaded bolt, a housing through which the threaded bolt passes and a nut adapted to be placed on the threaded bolt. The configurations of the bolt head or the nut (the "receivable member") and the housing relative to one another are such that with the receivable member and housing in a first angular relationship, the receivable member and a portion of the housing may be passed through aligned apertures in a plurality of elements to be secured together and, with the receivable member and the housing in a second angular relationship, the blind bolt assembly may be fastened tight about the elements and the receivable member cannot be withdrawn back out through the apertures. The present invention also relates to a composite structure including such blind bolt assembly and to a method for using said blind bolt assembly.

It is accordingly a primary object of the present invention to provide a novel blind bolt providing such advantages.

It is another important object of the present invention to provide a novel blind bolt assembly essentially requiring only three parts and which is extremely easy to use, which is especially resistant to vibrational effects, which facilitates removal problems in the event it is desired to remove such bolt or separate the objects which have been fastened together and which is capable of preventing such objects from rotating with respect to one another.

It is still another important object of the present invention to provide a novel method of using the novel blind bolt described herein.

These and other important objects and advantages of the present invention will become more apparent through reference to the ensuing discussion and claims, and appended drawings wherein:

FIG. 1 is a plan view of a preferred form of the blind bolt assembly of the present invention, with the triangular legs of the main housing aligned with the triangular bolt head;

FIG. 2 is a side elevation of the assembly of FIG. 1;

FIG. 3 is a transverse sectional view taken along lines 3—3 of FIG. 2;

FIG. 4 is a transverse sectional view similar to that of FIG. 3 but illustrating the main housing and the triangular bolt head rotated with respect to one another through a 60° angle;

FIG. 5 is a perspective view of the blind bolt assembly illustrated in FIGS. 1–4 in locked position about two elements which have been fastened to one another; and FIG. 6 is an exploded perspective view showing the three elements of the blind bolt assembly of FIGS. 1–5.

The blind bolt assembly of the present invention is comprised of three members, a main housing 10, a bolt 12 and a nut 14 (see FIG. 6). Main housing 10 comprises a first portion 16 and a second portion 18. The first portion, in its preferred form, is generally washer-shaped and has a centrally located opening 20 for receiving the threaded shank 22 of bolt 12. The second portion 18 of main housing 10, in its preferred form, is comprised of three axially extending triangular legs 24 spaced equidistantly about the periphery of first portion 16.

Attached to bolt shank 22 is a triangular bolt head 26, the configuration of which bears a special relation to the triangular legs 24 of main housing 10. More specifically, bolt head 26 and triangular legs 24 are so constructed that when they are in alignment with one another as illustrated in FIG. 3, the outer configurations of the triangles formed by each exactly coincide with one another. This is readily accomplished not only by the proper spacing of each of legs 24 with respect to one another but by making the angle between the two outer surfaces 25 and 27 of each of legs 24 (indicated as "$\gamma$" in FIG. 3) equal to the corresponding angle between the legs of triangular bolt head 26. The result is that each of the two outer usrfaces 25 and 27 each leg 24 will lie along a line defining one side of a large triangle which is identical in size to the triangle formed by the outer configuration of bolt head 26.

In addition to the foregoing, the innermost surfaces 28 of triangular legs 24 (see FIG. 3) are so arranged with respect to one another that they each lie along a line forming one side of a second triangle (shown in FIG. 3 in phantom lines as triangle 30). This triangle 30 is of substantially the same size as the triangle formed by the outer configuration of bolt head 26 and by the outer surfaces 25 and 27 of legs 24. As a result of this fact, when bolt head 26 is rotated through 60° with respect to the main housing 10 as illustrated in FIG. 4, bolt head 26 will coincide with triangle 30. By making triangle 30 slightly larger than bolt head 26, bolt head 26 will, in the position illustrated in FIG. 4, be able to be recessed within the opening formed between the surfaces 28 of legs 24, the nature of such recessing being illustrated more specifically in FIG. 5.

Because it is necessary to know when bolt head 26 and legs 24 are aligned with one another and since both the bolt head 26 and legs 24 will be hidden from view when using the blind bolt assembly to secure two objects to one another, markings are provided on an accessible portion of the blind bolt assembly so that the user can readily determine when such alignment takes place. More specifically, the face 32 of the free end of bolt 12 is provided with a mark 34. A corresponding mark 36 is provided in the exposed face 38 of main housing 10. As may be seen in FIG. 1 (and in phantom in FIG. 3) bolt head 26 will be aligned with legs 24 when marks 34 and 36 are aligned with one another. Bolt head 26 may readily be moved to a position where it may be recessed between legs 24 (as shown in FIGS. 4 and 5) by rotating bolt 12 through about 60°, as indicated by the angle between marks 34 and 36 (shown in phantom in FIG. 4) which may readily be viewed by the user.

In order to secure several objects together by means of the blind bolt assembly of the present invention, the assembly is readied for use by passing the thread shank 22 of bolt 12 through opening 20 in main housing 10 in a direction extending from legs 24 toward first housing portion 16. Nut 14 may then be loosely threaded about shank 22. By aligning marks 34 and 36 with one another, bolt head 26 will be aligned with legs 24 of the main housing 10. The elements or objects to be secured to one another (illustrated in FIG. 5 at 38 and 40) are then properly positioned with respect to one another so that the apertures provided in such elements are aligned with one another. When elements 38 and 40 are to be secured by means of the preferred blind bolt assembly illustrated in FIGS. 1–6, each of elements 38 and 40 should be provided with a triangular aperture 42 which is substantially the same size as bolt head 26 except that sufficient clearance is provided to permit bolt head 26 and legs 24 to pass into such apertures. Since bolt head 26 and legs 24 are aligned with one another, they will readily pass into apertures 42. And since the first portion 16 of the main housing 10 is larger than apertures 42, the limit of insertion of the bolt head 26 and legs 24 will be the point at which the inner face of first portion 16 abuts element 38.

At this point, bolt 12 is rotated through about 60° with respect to main housing 10 (as indicated by the relative positions of marks 34 and 36) and bolt head 26 recessed within the opening formed between the inner surfaces 28 of legs 24 until it is in the position illustrated in FIG. 5, forming a six-pointed star in the process. Such recessing may readily be accomplished by pulling bolt 12 in a direction away from the elements 38 and 40 until full seating takes place. At this point, the nut is securely tightened about shank 22 of bolt 12 to form a secure assembly.

As will be apparent, the length of legs 24 can be varied depending upon the total thickness of the objects to be fastened together, the only important point being that in practice legs of sufficient length should be used to provide an appropriately projecting leg portion beyond the outer limits of the innermost of the elements to be secured together to permit proper recessing between such legs of the bolt head 26.

The advantages of the blind bolt assembly of the present invention are many. In the first place, it is sufficiently simple in its construction so that it may be economically manufactured and sold at a competitive price. Secondly, it is so constructed that it may be used to fasten a plurality of elements together quickly and simply. Thirdly, as a result of the inter-relation between the configurations of the legs of the main housing and the bolt head, together with the interrelationship between the bolt head configuration and that of the apertures in the objects to be assembled, the blind bolt assembly is extremely resistant to vibrational effects. This same relationship prevents the two objects being assembled together from rotating with respect to one another and also prevents the main body of the blind bolt assembly from rotating with respect to such objects, facilitating the securing of objects and ensuring the proper alignment of such objects with respect to one another.

The blind bolt assembly of the present invention provides still additional advantages. For example, it is often desired to remove a bolt so as to separate the elements secured. The blind bolt assembly of the present invention can be readily unlocked and removed when this is desired notwithstanding the age of the assembly and the possible significant accumulation of rust, this advantage being made possible by the manner in which the elements of the assembly are locked with respect to one another and with respect to the objects which are secured. Still further, because the blind bolt assembly of the present invention does not rely upon an eccentric mounting (such, for example, as is provided in the assembly of Patent 1,785,709), the forces on the objects being secured which are imposed by the in-place blind bolt assembly are completely balanced, preventing loosening of the assembled objects.

As illustrated in the drawings and as described above, the geometric figures formed by the bolt head 26, the legs 24 of the main housing 10 and the apertures 42 in the elements to be assembled are in the form of equilateral triangles. This particular form is preferred because it provides the simplest construction while at the same time providing the maximum resistance to withdrawal of the blind bolt assembly from the elements secured thereby. Quite obviously, many of the broad advantages of the present invention can be obtained by using other than triangular configurations, so long as the respective configurations of the various elements prevent rotation of the bolt relative to the main housing (when the former is recessed in the latter) and the main housing is secured against rotation relative to the apertures in the elements to be secured to one another. This may readily be accomplished by making certain that that part of the second portion of the main housing which is seated within the apertures of the elements to be secured in non-circular in its outer configuration and mates with similarly shaped apertures in such elements. At the same time, the bolt head configuration and that of the opening between legs 24 in which the bolt head is adapted to be recessed should similarly be non-circular.

The maximum advantage from the blind bolt assembly of the present invention is obtained when the size and shape of the apertures of the elements to be assembled together are substantially identical to those of the bolt head and the geometric figure formed by the extension of the outer surfaces of the legs of the main housing (with sufficient tolerance to permit entry therein of the bolt head and legs of the main housing). It is also possible to obtain many of the advantages of the present invention by maintaining such condition only with respect to the aperture in the rearmost element to be secured (the one closest to the bolt head or, as shown in FIG. 5, element 40) with the aperture in the other element (element 38 in FIG. 5) being of any shape sufficiently large to permit the bolt head 26 and legs 24 to pass through it when they are in aligned position but sufficiently small so as not to permit the first portion 16 of the main housing 10 to do so.

The blind bolts of the present invention will be useful wherever the access problem previously described is presented. They are particularly advantageous in situations in which the stripping of bolt threads is not uncommon, such as the bolts used in automobiles to mount tires. In the latter situation, the hub on which the tire is mounted can be provided with triangular apertures with mating apertures being provided in the wheel. The wheel can then be secured to the hub by inserting a blind bolt assembly in each pair of aligned triangular apertures in the wheel and hub.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:
1. A blind bolt assembly comprising:
  (a) a bolt having a head and a threaded shank adapted to receive a nut;
  (b) a housing having an axially extending opening for receiving the shank of said bolt;
  (c) said housing having a first portion and a second portion, said opening passing through both of said first and second portions;
  (d) the outer most peripheral surface of the second portion of said housing having a non-circular configuration and being comprised of at least three legs between which is a second opening having an inner configuration capable of receiving said bolt head;
  (e) said bolt head having surfaces which, when said bolt head is received within said second opening, are adapted to abut against corresponding surfaces on said legs so as to lock said bolt head against rotation relative to said legs;
  (f) said bolt head having a transverse dimension sufficiently large relative to the transverse dimension of said axially extending opening to prevent said bolt head from passing through said axially extending opening;
  (g) the outer configurations of said bolt head and said second housing portion being of substantially the same size and shape so that when said bolt head and said second housing portion are aligned, they can both be passed through an opening of substantially the same size and shape as the outer configuration of said bolt head and said second portion whereas, when they are out of alignment, they cannot both be passed through said last-mentioned opening.

2. A composite structure comprised of two elements bolted together by means of a blind bolt assembly; said blind bolt assembly comprising:
  (a) a bolt having a head, a threaded shank and a nut on said threaded shank;
  (b) a housing having an axially extending opening for receiving the shank of said bolt;
  (c) said housing having a first portion and a second portion, said opening passing through both of said first and second portions;
  (d) the outer most peripheral surface of the second portion of said housing having a non-circular configuration;
  (e) said second portion having a second opening having an inner configuration capable of receiving said bolt head;
  (f) the outer configuration of said bolt head and the inner configuration of said second opening being such that when said bolt head is recessed in siad second opening, said bolt head is locked against rotation relative to said second portion;
  (g) the axial length of said second housing portion exceeding the combined thicknesses of said two elements;

the bolt shank of said blind bolt assembly passing through said axially extending opening in said housing in the direction extending from said second housing portion to said first housing portion and with said nut in threaded engagement with said bolt shank; the first housing portion being in contact with one of said elements; said bolt head being in contact with the other of said elements; each of said elements having an aperture aligned with the aperture of the other of said elements; said apertures both being of a size sufficient to permit said bolt head and said second housing portion to pass through them when the latter two are aligned in a first position and said bolt head is not recessed in said second opening; the aperture in at least said other element being of a size and shape such that said bolt head cannot be retracted through it when said bolt head is recessed in said second opening; the configuration and size of the aperture in at least said other element being substantially the same as that of the outer configurations of said bolt head said second housing portion; said second housing portion being at least partially positioned in the aperture of said other element so that they are locked against rotation with respect to one another; said bolt head being recessed in said second opening and abutting the surfaces of said other element which is most remote from the surface of said one element with which said first housing portion is in contact.

3. A composite structure comprised of two elements bolted together by means of a blind bolt assembly; said blind bolt assembly comprising:
  (a) a bolt having a head, a threaded shank and a nut on said threaded shank;
  (b) a housing having an axially extending opening for receiving the shank of said bolt;
  (c) said housing having a first portion and a second portion, said opening passing through both of said first and second portions;
  (d) the outermost peripheral surface of the second portion of said housing having a non-circular configuration;
  (e) said second portion having a second opening having an inner configuration capable of receiving said bolt head;
  (f) the outer configurations of said second housing portion and bolt head being triangular;
  (g) the inner configuration of said second opening also being triangular and of substantially the same size as the outer configuration of said bolt head and second portion, whereby when said bolt head is recessed in said second opening, said bolt head is locked against rotation relative to said second portion;
  (h) the axial length of said second housing portion exceeding the combined thicknesses of said two elements;
  (i) the outer configuration of said bolt head and said second housing portion being both of substantially the same size and shape so that when said bolt head and said second housing portion are aligned, they can both be passed through an opening of substantially the same size and shape as the outer configuration of said bolt head and second portion whereas, when they are out of alignment, they cannot both be passed through said last-mentioned opening;

the bolt shank of said blind bolt assembly passing through said axially extending opening in said housing in the direction extending from said second housing portion to said first housing portion and with said nut in threaded engagement with said bolt shank; the first housing portion being in contact with one of said elements; said bolt head being in contact with the other of said elements; each of said elements having an aperture aligned with the aperture of the other of said elements; said apertures both being triangular and of substantially the same size as the outer configuration of said second housing portion and bolt head; said second housing portion being at least partially positioned in the aperture of said other element so that they are locked against rotation with respect to one another; said bolt head being recessed in said second opening and abutting the surface of said other element which is most remote from the surface of said one element with which said first housing portion is in contact.

4. A method of bolting two elements together by means of a blind bolt assembly; said blind bolt assembly comprising:
 (a) a bolt having a head, a threaded shank and a nut on said threaded shank;
 (b) a housing having an axially extending opening for receiving the shank of said bolt;
 (c) said housing having a first portion and a second portion, said opening passing through both of said first and second portions;
 (d) the outermost peripheral surface of the second portion of said housing having a non-circular configuration;
 (e) said second portion having a second opening having an inner configuration capable of receiving said bolt head;
 (f) the outer configuration of said bolt head and the inner configuration of said second opening being such that when said bolt head is recessed in said second opening, said bolt head is locked against rotation relative to said second portion;
 (g) the axial length of said second housing portion exceeding the combined thicknesses of said two elements;
 (h) the outer configuration of said bolt head and said second housing portion being both of substantially the same size and shape so that when said bolt head and said second housing portion are aligned, they can both be passed through an opening of substantially the same size and shape as the outer configuration of said bolt head and second portion whereas, when they are out of alignment, they cannot both be passed through said last-mentioned opening; said method comprising the following steps:
  (1) providing two elements each of which has an aperture of substantially the same size as the outer configuration of said second housing portion and said bolt head;
  (2) aligning the apertures of said elements;
  (3) positioning the bolt shank in the axially extending opening in said housing so that said shank passes through said opening in a direction from said second to said first housing portion;
  (4) aligning said bolt head and second housing portion;
  (5) passing said bolt head and said second housing portion while in said aligned position through said aligned apertures so that when said first housing portion is in contact with one of said elements, at least a portion of said second housing portion will be positioned in said apertures;
  (6) rotating said bolt relative to said housing so that said bolt head is moved out of alignment with said second housing portion;
  (7) causing said bolt head to be recessed in said second opening and moving it in said second opening until it comes into contact with the other of said elements and abuts said other element while in said second opening; and
  (8) tightening a nut about and in threaded engagement with said bolt shank.

5. A composite structure comprised of two elements bolted together by means of a blind bolt assembly; said blind bold assembly comprising:

(a) a bolt having a head, a threaded shank and a nut on said threaded shank;
 (b) a housing having an axially extending opening for receiving the shank of said bolt;
 (c) said housing having a first portion and a second portion, said opening passing through said first and second portions;
 (d) the outermost peripheral surface of the second portion of said housing having a non-circular configuration;
 (e) said second portion having a second opening having an inner configuration capable of receiving at least one of said bold head and said nut (hereinafter referred to as said "receivable member");
 (f) said receivable member having surfaces which, when said receivable member is received within said second opening, are adapted to abut against corresponding surfaces bounding said second opening so as to lock said receivable member against rotation relative to said second portion;
 (g) the axial length of said second housing portion exceeding the combined thicknesses of said two elements;

the bolt shank of said blind bolt assembly passing through said axially extending opening in said housing in the direction extending from said second housing portion to said first housing portion and with said nut in threaded engagement with said bolt shank; the first housing portion being in contact with one of said elements; said receivable member being in contact with the other of said elements; each of said elements having an aperture aligned with the aperture of the other of said elements; said apertures both being of a size sufficient to permit said receivable member and said second housing portion to pass through them when the latter two are aligned in a first position and said receivable member is not recessed in said second opening; the aperture in at least said other element being of a size and shape such that said receivable member cannot be retracted through it when said receivable member is recessed in said second opening; the configuration and size of the aperture in at least said other element being substantially the same as that of the outer configurations of said receivable member and said second housing portion; said second housing portion being at least partially positioned in the aperture of said other element so that they are locked against rotation with respect to one another; said receivable member being recessed in said second opening and abutting the surface of said other element which is most remote from the surface of said one element with which said first housing portion is in contact.

6. A blind bolt assembly as defined in claim 1 including a nut adapted to be placed in threaded engagement with the threaded shank of said bolt.

7. A blind bolt assembly as defined in claim 1 wherein said axially extending opening is substantially in alignment with the center of said housing.

8. A blind bolt assembly as defined in claim 1 wherein the outer configurations of said first and second housing portions are such that said second portion can be received in an opening which is too small to receive said first portion.

9. A blind bolt assembly as defined in claim 8 wherein said second portion is comprised of a plurality of legs spaced from one another and depending from said first portion in an axial direction; said opening in said second portion being defined by the radially innermost surfaces of said legs.

10. A blind bolt assembly as defined in claim 9 wherein said second portion contains three legs and wherein the radially innermost surface of each of said legs lies along a line defining one side of a triangle.

11. A blind bolt assembly as defined in claim 10 wherein each of said legs is triangular in cross section; one side of each of said legs comprising said radially innermost surface; each of the other sides of said legs lying along a line defining one side of a second triangle other than the first triangle defined by the lines along which said innermost surfaces lie.

12. A blind bolt assembly as defined in claim 11 wherein said first and second triangles are equilateral and of substantially the same size.

13. A blind bolt assembly as defined in claim 1 wherein the outer configurations of said second housing portion and bolt head are triangular; the inner configuration of said second opening also being triangular and of substantially the same size as the outer configuration of said bolt head and second portion.

14. A blind bolt assembly as defined in claim 1 wherein said bolt and said housing are provided with means for identifying when said bolt head and said second housing portion are aligned.

References Cited

UNITED STATES PATENTS

| | | | |
|---|---|---|---|
| 1,296,275 | 3/1919 | Firth | 85—14 |
| 2,332,752 | 10/1943 | Ratcliff | 151—68 |

EDWARD C. ALLEN, *Primary Examiner.*

CARL W. TOMLIN, *Examiner.*

R. S. BRITTS, *Assistant Examiner.*